United States Patent
Fitton

(10) Patent No.: US 8,433,322 B1
(45) Date of Patent: *Apr. 30, 2013

(54) PROCESSOR FOR A BASE STATION CONTROL UNIT

(75) Inventor: Michael Fitton, London (GB)

(73) Assignee: Altera Corporation, San Jose, CA (US)

(*) Notice: Subject to any disclaimer, the term of this patent is extended or adjusted under 35 U.S.C. 154(b) by 1 day.

This patent is subject to a terminal disclaimer.

(21) Appl. No.: 13/159,081

(22) Filed: Jun. 13, 2011

Related U.S. Application Data

(63) Continuation of application No. 11/758,255, filed on Jun. 5, 2007, now Pat. No. 7,961,669.

(51) Int. Cl.
*H04Q 7/00* (2006.01)

(52) U.S. Cl.
USPC ............ 455/436; 370/328; 370/320; 370/342

(58) Field of Classification Search .................. 455/436, 455/561; 370/310.2, 320, 328, 335, 342
See application file for complete search history.

(56) References Cited

U.S. PATENT DOCUMENTS

| | | |
|---|---|---|
| 5,917,829 A | 6/1999 | Hertz et al. |
| 7,103,026 B2 | 9/2006 | Hall et al. |
| 7,653,021 B2 | 1/2010 | Schulist |
| 7,817,603 B2 | 10/2010 | Liu |
| 2007/0213062 A1 | 9/2007 | Medlock et al. |

*Primary Examiner* — Ajit Patel
*Assistant Examiner* — Myron K Wyche
(74) *Attorney, Agent, or Firm* — Ropes & Gray LLP

(57) ABSTRACT

There is provided a processor for a base station control unit, the base station control unit being associated with a plurality of antennas; the processor comprising a plurality of processing streams, each stream being suitable for generating signals for at least one user in a plurality of users; wherein any of the processing streams can be used to generate the signals for any user in the plurality of users and for transmission by any antenna in the plurality of antennas.

32 Claims, 14 Drawing Sheets

$P = P_0 P_1$

|    | 00 | 01 | 10 | 11 |
|----|----|----|----|----|
| 00 | 0  | 0  | 0  | 0  |
| 01 | 0  | 1  | 0  | 1  |
| 10 | 0  | 0  | 1  | 1  |
| 11 | 0  | 1  | 1  | 0  |

$X = f(\text{code, position})$
$= f(C, P)$
$= (C_0 \text{ AND } P_0) \text{ XOR } (C_1 \text{ AND } P_1)$ $P = P_0 P_1$

|    | 00 | 01 | 10 | 11 |
|----|----|----|----|----|
| 00 | 0  | 0  | 0  | 0  |
| 01 | 0  | 0  | 1  | 1  |
| 10 | 0  | 1  | 0  | 1  |
| 11 | 0  | 1  | 1  | 0  |

$= f(C, P)$
$= (C_1 \text{ AND } P_0) \text{ XOR } (C_0 \text{ AND } P_1)$

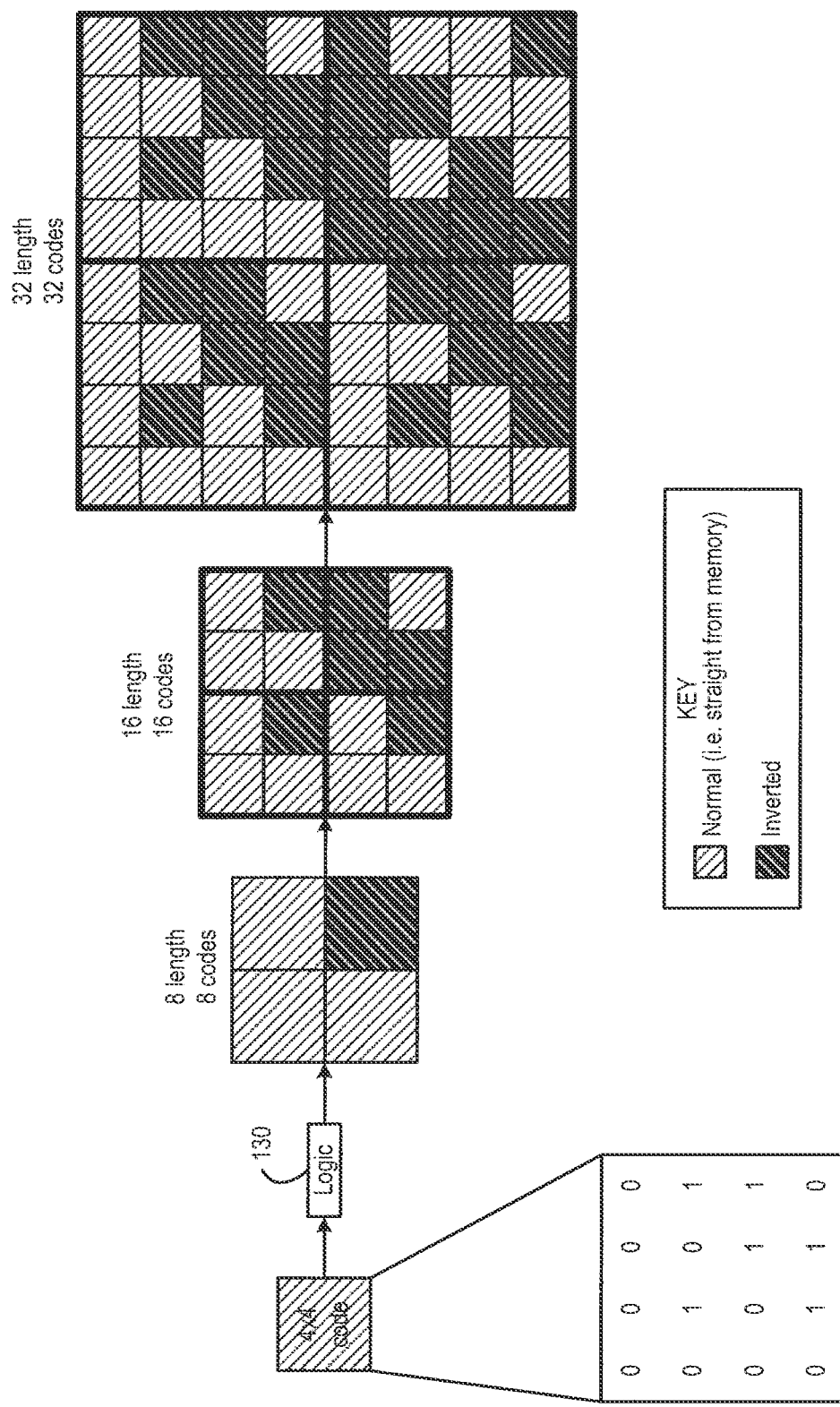

PROCESSOR FOR A BASE STATION CONTROL UNIT

CROSS-REFERENCE TO RELATED APPLICATION

This application is a continuation of U.S. patent application Ser. No. 11/758,255, filed on Jun. 5, 2007 (now U.S. Pat. No. 7,961,699), the disclosure of which is hereby incorporated by reference herein in its entirety.

TECHNICAL FIELD OF THE INVENTION

The invention relates to a processor for a base station control unit, and in particular relates to a processor for a base station control unit that is for use in a system in which the base station control unit is remote from a plurality of antennas.

BACKGROUND TO THE INVENTION

In communications systems, base stations are provided that transmit signals to and receive signals from mobile terminals. Conventionally, a base station with an RF transceiver is collocated with a mast that has one or more antennas.

However, in the Remote Radio Head concept, a centrally located base station control unit (Node B in a W-CDMA communication system) is provided that is located some distance from the mast and antennas. In this case, an RF transceiver is provided at each mast, separate to the base station control unit.

This concept means that a single base station control unit can generate the transmission signals for a large number of users and map the signals onto the appropriate RF transceivers and antennas.

Typically, a separate implementation would be used for each antenna; there would be no sharing of processing resources between the streams and there would be a maximum number of users that could be allocated to each stream. For example, if there were sixty-four antennas, there would be sixty-four separate processing streams. These processing streams will consume a significant amount of hardware resources, even though they are likely to only be lightly loaded most of the time (i.e. the number of users supported will be much less than the maximum number of users per antenna).

Therefore, it is an object of the invention to provide a processor for a base station control unit that overcomes, or at least significantly mitigates, the disadvantages associated with the implementation described above.

SUMMARY OF THE INVENTION

In accordance with a first aspect of the invention, there is provided a processor for a base station control unit, the base station control unit being associated with a plurality of antennas; the processor comprising a plurality of processing streams, each stream being suitable for generating signals for at least one user in a plurality of users; wherein any of the processing streams can be used to generate the signals for any user in the plurality of users and for transmission by any antenna in the plurality of antennas.

According to a second aspect of the invention, there is provided an architecture for pre-aggregating signatures, the architecture comprising a signature store for storing a predetermined set of signature sequences, each signature sequence comprising a plurality of symbols, the signature store outputting, in parallel, a first symbol from each of a subset of the plurality of signature sequences; and an adder tree for summing the respective first symbols to provide a first pre-aggregated output.

According to a third aspect of the invention, there is provided an architecture for pre-aggregating signatures, the architecture comprising a signature store for storing a predetermined set of signature sequences, each signature sequence comprising a plurality of symbols, the signature store outputting, in series, a first symbol from each of a subset of the plurality of signature sequences; and an adder for summing the respective first symbols to provide a first pre-aggregated output.

According to a fourth aspect of the invention, there is provided an architecture for generating variable-length spreading codes, the architecture comprising a code memory for storing a code block, the code block comprising a first set of codes having a corresponding first length; a processing unit for retrieving the code block from the code memory, and for forming a second set of codes having a corresponding second length by generating a first square grid comprising a plurality of copies of the code block, wherein the values of the codes in the copy of the code block in the bottom right corner of the first square grid are inverted.

BRIEF DESCRIPTION OF THE DRAWINGS

Embodiments of the invention will now be described, by way of example only, with reference to the following drawings, in which:

FIG. 10 illustrates the generation of OVSF codes in accordance with an aspect of the invention;

DETAILED DESCRIPTION OF THE PREFERRED EMBODIMENTS

Although the invention will be described with reference to a processor for a base station control unit in a wideband-code division multiple access (WCDMA) communication system, it will be appreciated that the invention is applicable to other types of communication system. Moreover, although the invention will be described as being implemented in a field-programmable gate array (FPGA), it will be appreciated that the invention can be implemented in other types of semiconductor devices.

As described above, prior art implementations of a base station control unit include a separate implementation for each antenna in which there is little or no sharing of processing resources between the streams and there is a maximum number of users that could be allocated to each stream. It is very difficult to allow the flexible allocation of users of any data types (for example speech or video) to a large number of antennas.

However, in accordance with the invention, a processor is provided which comprises a number of processing streams which can be flexibly allocated to any user of the communication system and any antenna.

Figure 1:
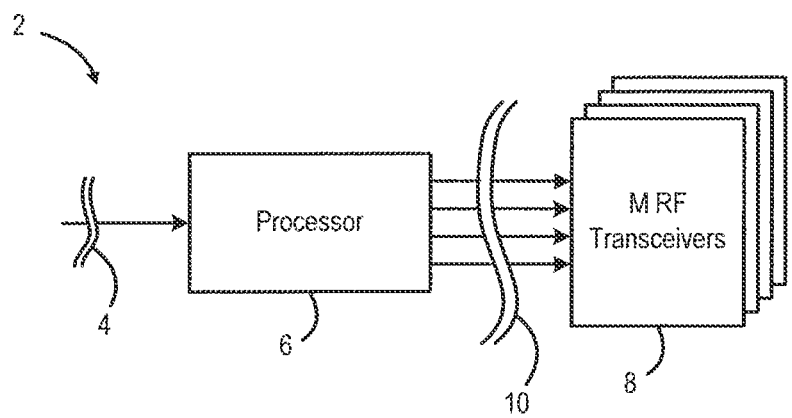
FIG. 1 is a block diagram of a transmit chain in accordance with an aspect of the invention.

FIG. 1 shows a simplified block diagram of the transmit chain 2 in accordance with the invention. A stream of data symbols for n users are received over an interface 4, such as a serial Rapid I/O (sRIO) interface, and are input into a processor 6 that processes the data symbols for transmission over the communication network. The processor 6 outputs each stream of processed data symbols to an appropriate RF transceiver 8 in a set of M RF transceivers 8 via an interface 10. In a preferred embodiment, the interface 10 is in accordance with the Common Public Radio Interface (CPRI) standard or is an interface in accordance with the Open Base Station Standard Initiative (OBSAI).

Figure 2:
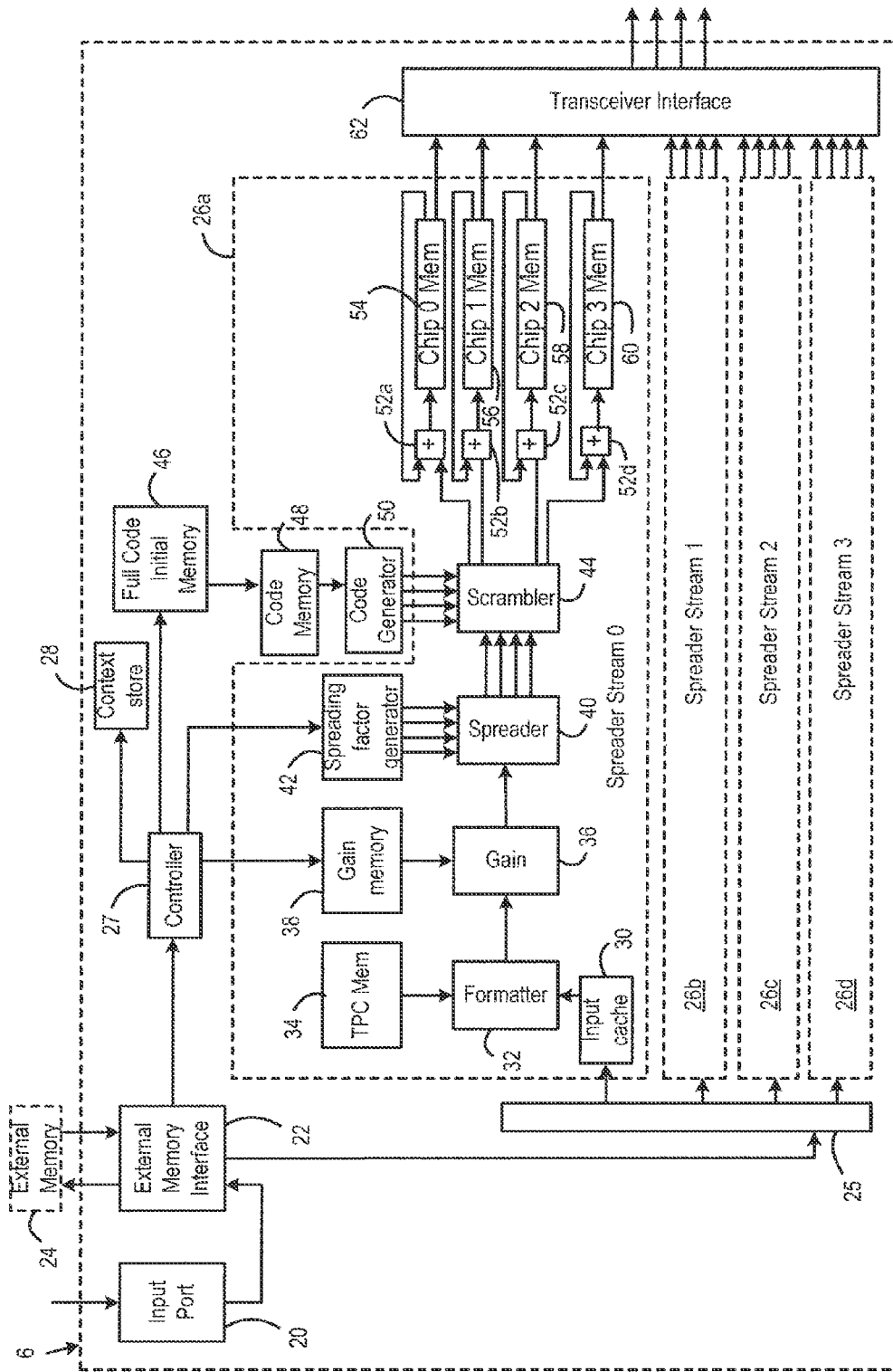
FIG. 2 is a block diagram of a processor for a base station control unit in accordance with an embodiment of the invention.

FIG. 2 is a block diagram of an exemplary implementation of the processor 6 in accordance with the invention.

In this illustrated embodiment, the maximum number of RF transceivers 8 is 64, the maximum number of spreaders is 1024 and the interface 10 is in accordance with the CPRI standard and comprises four separate CPRI links, with any antenna being mapped to any CPRI link. However, it will be appreciated by a person skilled in the art that the invention can be adapted for use with a different number of transceivers, spreaders and CPRI links.

The processor 6 comprises an input port 20 for receiving one or more streams of user data symbols and, in this embodiment, is compatible with an sRIO interface. The input port is connected to an external memory interface 22, which is connected to a memory 24, which is external to the processor 6. This external memory 24 is used for buffering user data at the processor, if necessary. Preferably, the external memory 24 can hold one frame of data symbols. In an alternative embodiment, if the amount of data to be buffered is small, the external memory 24 can be replaced with a memory that is internal to the processor 6.

The external memory interface 22 stores and retrieves frames of data in the external memory 24 as required. A further memory can be provided (although it is not shown in FIG. 2) for storing a map of the user data that is stored in the external memory 24. Preferably, the data is read from the external memory 24 for a duration of 256 chips.

The external memory interface 22 is connected to a scheduler 25, which is in turn connected to a plurality of spreader streams 26a, 26b, 26c and 26d. In this embodiment, there are four spreader streams, numbered from 0 to 3, although it will be appreciated that when the maximum number of RF transceivers 8 varies, more or less spreader streams can be provided. In accordance with an aspect of the invention, each spreader stream 26 processes four chips (derived from a single symbol) for a single user in parallel. Chips for another user can be processed in the next cycle, so the spreader stream architecture is pipelined.

Preferably, each of the spreader streams 26 is implemented separately in the processor 6, which means that each spreader stream 26 has its own memories and hardware. An exception to this is the calculation of the scrambling code and pre-aggregation (to be discussed later) which can be shared for each of the streams. This separate implementation means that there will be no contention for resources between the plurality of spreader streams. Each of the spreader streams 26 can process a data stream for any RF transceiver 8 and they can support any slot format (dedicated or common channel).

The scheduler 25 receives a stream of data symbols from the external memory interface 22, schedules the data for spreading and determines the spreader stream 26a, 26b, 26c or 26d to which the data stream should be applied.

Figure 3:
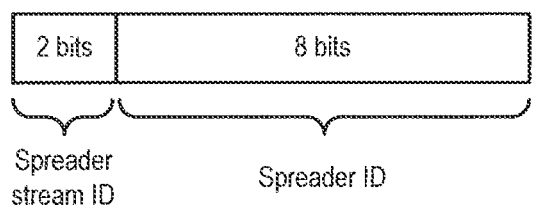
FIG. 3 illustrates the memory map used to map spreaders to spreading streams.

As described above, in this illustrated embodiment, there are 1024 spreaders. In a preferred embodiment of the invention, there is a simple mapping of spreaders to spreading streams. The first set of 256 spreaders (i.e. spreaders 0-255) are allocated to spreader stream 0, the second set of 256 spreaders (i.e. spreaders 256-511) are allocated to spreader stream 1, the third set of 256 spreaders (i.e. spreaders 512-767) are allocated to spreader stream 2 and the fourth set of 256 spreaders (i.e. spreaders 768-1023) are allocated to spreader stream 3. Thus, a simple memory map (as shown in FIG. 3) can be used by the scheduler to determine the destination spreading stream for the user data. In FIG. 3, the first two bits of the word indicate the identity of the spreader stream (i.e. 0, 1, 2 or 3), and the remaining eight bits indicate the identity of the spreader (i.e. 0-255) in that spreading stream.

The external memory interface 22 is also connected to a controller 27 which receives context and control information for the streams of user data, such as the destination antenna/RF transceiver 8, transmit power control (TPC) information, gain information, spreading code information, scrambling code information, transmit diversity mode information, etc. This context information is stored in a context store 28 which is internal to the processor 6. In this embodiment, the context store 28 is centralised and is shared by all of the spreader streams 26. However, in alternative embodiments, each spreader stream 26 can have a respective context store 28. The context store 28 is connected to the TPC memory 34, gain memory 38, spreading factor generator 42, code memory 48 (although these connections are not shown in FIG. 2), which will be described later. An internal context store 28 helps to reduce latency in the processor.

The structure of the first spreader stream 26a (stream 0) will now be described in further detail. The other spreader streams 26b, 26c and 26d have a corresponding structure.

The stream 26a comprises an input cache 30 which receives the data stream from the scheduler 25. In a preferred embodiment of the invention, the input cache 30 is a double-buffered input cache. As the data is read from the external memory 24 for a 256-chip duration, the input cache 30 can store between one and sixty-four symbols of user data, which, in the W-CDMA system, means that the spreading factor will range from 256 for one symbol (corresponding to a data rate of 16 kbps) to 4 for sixty-four symbols (corresponding to a data rate of 0.98 Mbps). If the data rate is only 8 kbps, the spreading factor would be 512, so a single symbol will be re-read from the external memory for two consecutive cache cycles.

Figure 4:
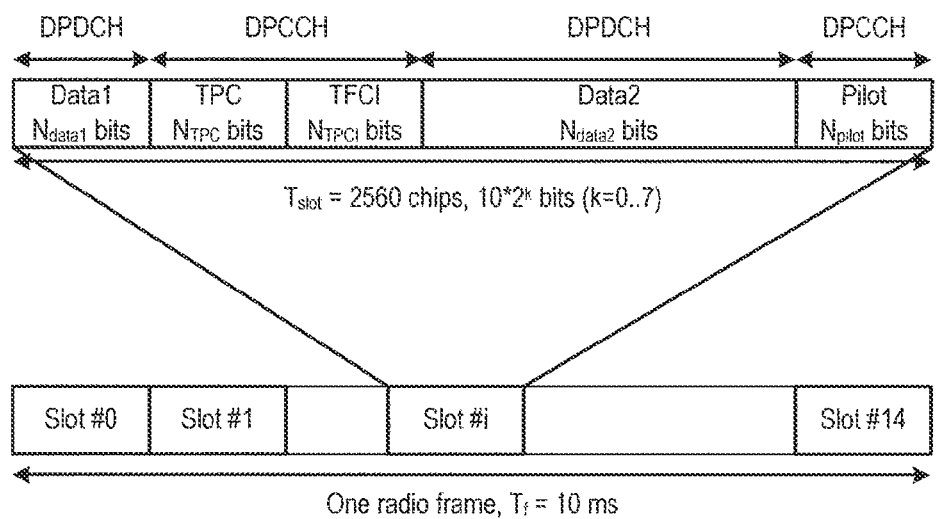
FIG. 4 shows an exemplary frame structure determined by a formatter.

The input cache 30 outputs data symbols to a formatter 32. A transmit power control (TPC) memory 34 is provided which stores information relating to the desired transmit power for the symbols stored in the input cache 30. This TPC information can be read to the TPC memory 34 from the context store 28. TPC information is output from the TPC memory 34 to the formatter 32. As is conventional in a W-CDMA system, the formatter 32 determines the type of data to transmit and the type of slot required. FIG. 4 shows an exemplary frame structure determined by the formatter 32. A slot format memory (not shown) stores the size of the fields in the slot and a pilot format memory (also not shown) stores the pilot bits.

Depending on the type of data to be transmitted (e.g. user data, transmit power control signals, transport format combination indicators, pilot channel information), the formatter 32 obtains the required data from a memory or input cache 30. The formatter 32 produces error flags if the required data is not available. The formatter 32 also serves to initialise the gain, spreading and scrambling blocks (to be described below).

In accordance with an aspect of the invention, it is possible to use two different approaches to generating common channels. A first approach involves providing common channel generation hardware for each of the spreader streams 26a, 26b, 26c and 26d. This results in a simple implementation of the scheduler 25, and can be used for generating E-RGCH, E-HICH, AICH and SCH common channels in a W-CDMA system.

The alternative approach (which is not illustrated in FIG. 2) is to provide hardware for generating the common channels that is shared between the spreader streams 26. Either shared channels can be generated prior to the formatter 32 in the spreader streams 26, which can be used for generating PICH and MICH channels, or a spreader stream can generate SCH channels, and all other spreader streams can be scheduled to that channel. This approach uses less hardware than the first approach, but increases the complexity of the scheduler 25.

The Acquisition Indicator Channel (AICH) is used to indicate from the base station the reception of a random access channel signature sequence. The AICH uses the same signature sequence as that used in the random access channel (RACH) and the response to the RACH transmission includes that same signature. The AICH is a fixed rate (spreading factor 256) physical channel, and it is assumed that there is one AICH per RF transceiver 8.

The AICH comprises fifteen consecutive access slots (AS), each having a length of 5120 chips. Each access slot comprises an acquisition indicator part, which includes 32 real-valued signals having a length of 4096 chips, and a null transmission having a length of 1024 chips. The signature sequence is sixteen symbols long, and the 32 signatures are set out (for W-CDMA) in a specification.

Up to sixteen signatures can be acknowledged on the AICH at the same time. Thus, up to sixteen codes need to be summed together to form the AICH channel.

Every 128 chips, one new AICH symbol is calculated, and there are 8192 chip cycles available. For all AICH channels, a current slot is read (i.e. slot 0-15, 4 bits required to identify the slot), a current symbol is read (i.e. 0-39, with transmission off for the last 8 symbols, 6 bits required to identify the current symbol, with the most significant bit indicating that the transmission is off), a corresponding acquisition indicator or indicators ($AI_s$) are read, depending on whether the AICH is generated in series (one $AI_s$) or parallel (sixteen $AI_s$), and a corresponding signature value or values $b_{s,j}$ (where s is the signature number and j is the bit number in the signature) are read (one for serial implementation and sixteen for parallel implementation). Finally, $a_j$, which is the AICH bit value, is calculated in serial or parallel from $$a_j = \sum_{s=0}^{15} AI_s b_{s,j}$$

and is stored in a double buffer. The cycle count is 48*1 cycle per symbol when processed in parallel, and 48*16 cycles per symbol when processed in series.

FIGS. 5(*a*) and 5(*b*) show an exemplary architecture for pre-aggregating AICH signatures in parallel. This architecture can be found in the formatter 32 of each spreading stream 26. Alternatively, a common architecture can be provided for all of the spreading streams 26. An AICH controller 70 outputs the values for the parameters tx_off, which indicates whether the transmission is off, j count, which indicates the bit of the signature being processed, and ant_num, which indicates the antenna for which the AICH is being generated. The AICH controller 70 is connected to an AI memory 72 which stores the acquisition indicators $AI_s$ for all 64 possible RF transceivers 8. Two counters are also provided, an AICH symbol count 74 (which counts from 0-39) and an AICH slot count 76 (which counts from 0-15), that, on receipt of the value of ant_num from the controller 70, output the appropriate symbol and slot counts to the AICH controller 70.

The architecture further comprises an AICH signature store 78 that stores the predetermined AICH signature sequences. As described above, in this implementation there are 16 signature sequences of 32 bits, with a respective bit being labelled $b_{s,j}$. Predetermined AICH signature sequences as defined in the 3GPP specification for WCDMA can be stored in the store 78.

The AICH signature store 78 receives the j count value from the AICH controller 70 (i.e. 4 bits representing a value of 0-31), which indicates the symbol of the 16 signatures currently being processed. The AICH signature store 78 outputs the symbol in position j for each signature in the store 78 to a respective triple-input inverter 80a-80p. The inverters 80a-80p also have a pair of inputs (labelled invert and enable) for receiving the respective acquisition indicator value $AI_0$ to $AI_{15}$ for the respective signature from the memory 72.

The output of each inverter 80a-80p comprises a two-bit value that is input into an adder tree 82 that comprises a plurality of adders 84. The adder tree 82 sums these two-bit values into a six-bit output for AICH symbol j. This output is stored in a pre-aggregated AICH memory 86 for the respective antenna indicated by the value of ant_num.

Thus, the symbols in position j of each of the signatures are summed in parallel, since they are output from the AICH signature store 78 at the same time.

After each complete summing operation, the AICH symbol count 74 is stepped up by one, and the next symbol (j+1) for each signature is read out to the respective inverter 80a-80p, along with the respective acquisition indicator value $AI_s$ from the memory 72. Once the j count reaches 31, the slot count recorded by AICH slot counter 76 is incremented by one, and the j count is reset.

Figure 6A:
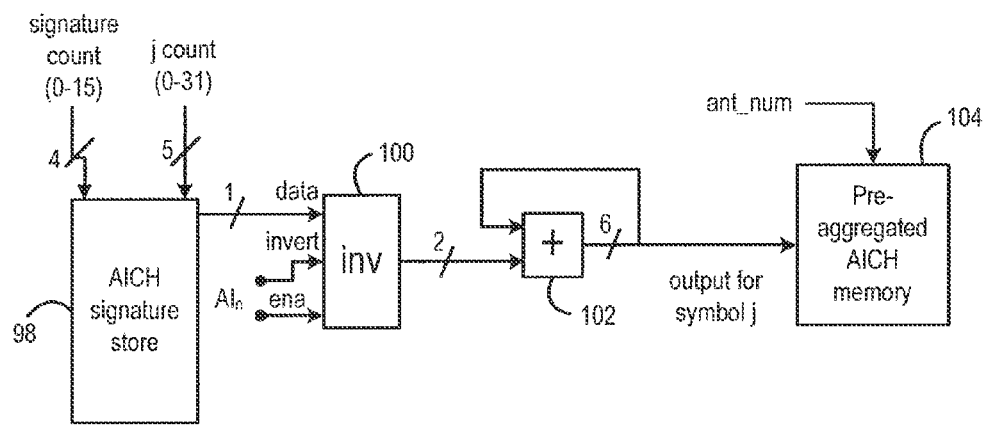
FIGS. 6(a) and 6(b) illustrate an architecture for pre-aggregating AICH signatures in series.
Figure 6B:
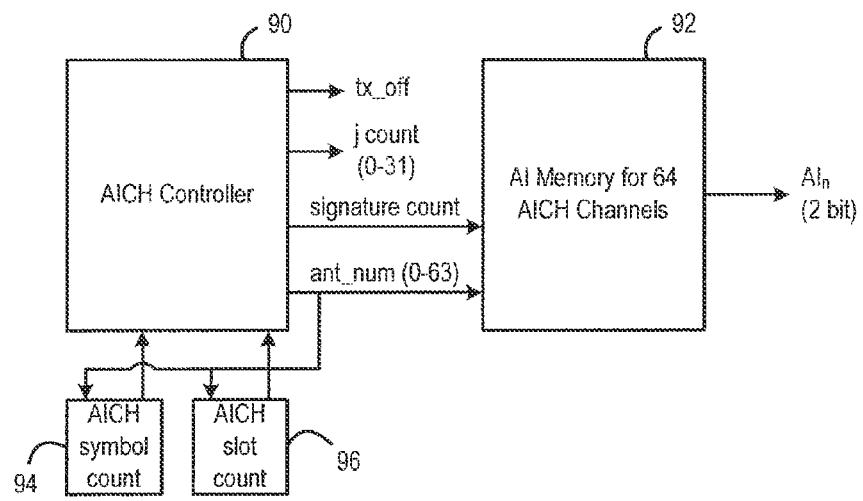

FIGS. 6(*a*) and 6(*b*) show an exemplary architecture for pre-aggregating AICH signatures in series. This architecture can be found in the formatter 32 of each spreading stream 26. Alternatively, a common architecture can be provided for all of the spreading streams 26. An AICH controller 90 outputs the values for the parameters tx_off, which indicates whether the transmission is off, j count, which indicates the symbol of the signature s being processed, signature count, which indicates the signature s being processed, and ant_num, which indicates the antenna for which the AICH is being generated. The AICH controller 90 is connected to an AI memory 92 which stores the acquisition indicators $AI_s$ for all 64 possible RF transceivers 8. Two counters are also provided, an AICH symbol count 94 (which counts from 0-39) and an AICH slot count 96 (which counts from 0-15), that, on receipt of the value of ant_num from the controller 90, output the appropriate symbol and slot counts to the AICH controller 90.

The architecture further comprises an AICH signature store 98 that stores the predetermined AICH signature sequences. As described above, in this implementation there are 16 signature sequences of 32 bits. The predetermined AICH signature sequences are defined in the 3GPP specification for WCDMA.

The AICH signature store 98 receives the j count value from the AICH controller 90 (i.e. 4 bits representing a value of 0-31), and the signature count which indicates the signature and symbol of the 16 possible signatures to be output by the signature store 98. The AICH signature store 98 outputs the symbol in position j for signature s in the store 98 to a triple-input inverter 100. The inverter 100 also has a pair of inputs (labelled invert and enable) for receiving the acquisition indicator value $AI_s$ for the selected signature from the memory 92.

The output of the inverter 100 comprises a two-bit value that is input into a dual-input adder 102. The output of the adder 102 is fed back to one of its inputs, so that the output of the inverter 100 is summed with the previous output of the adder 102. After the symbol j for signature s is read out of the AICH signature store 98, the value of signature count is incremented by one, and symbol j for signature s+1 is read out of the store 98. This latter symbol is input into the inverter 100 with the corresponding acquisition indicator $AI_{s+1}$ from memory 92.

Figure 5A:
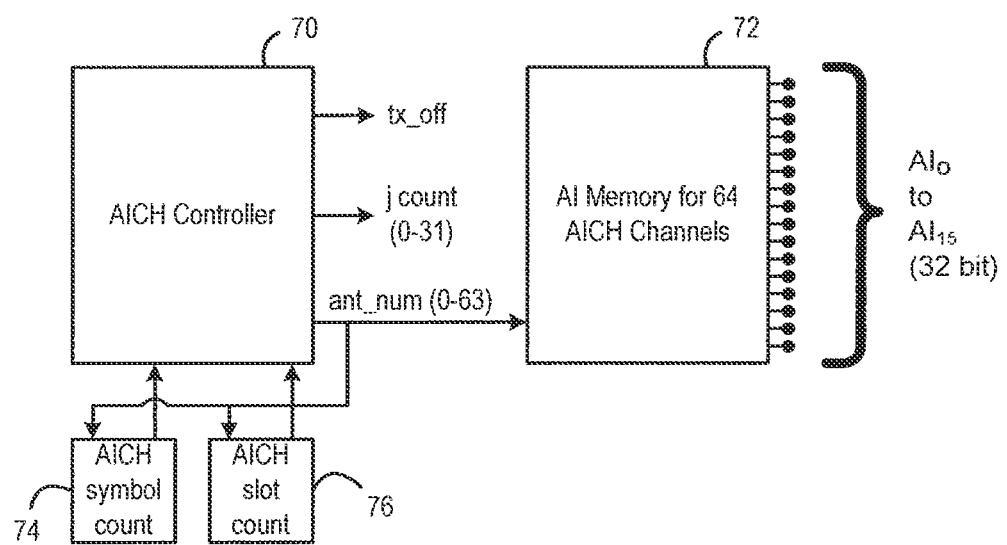
FIGS. 5(a) and 5(b) illustrate an architecture for pre-aggregating AICH signatures in parallel.

Thus, as each preceding output of the adder 102 is summed with the output of the inverter 100 for the next signature, the resulting output of the adder 102 is a six-bit output for AICH symbol j, as in the architecture shown in FIGS. 5(a) and (b). Again, this output is stored in a pre-aggregated AICH memory 104 for the respective antenna indicated by the value of ant_num.

Thus, the symbols in position j of each of the signatures are read out of the AICH signature store 98 and summed by adder 102 in series. Thus, this architecture uses 16 cycles to calculate the output for the AICH symbol j, in comparison to just a single cycle for the parallel implementation shown in FIGS. 5(a) and (b).

After one summing operation, the AICH symbol count 94 is stepped up by one, and the next symbol (j+1) for signature 1 is read out to the inverter 100, along with the respective acquisition indicator value $AI_1$ from the memory 92.

These architectures (i.e. those in FIGS. 5 and 6) have reduced latency in comparison with prior art architectures.

The E-DCH Hybrid ARQ Indicator Channel (E-HICH) and E-DCH Relative Grant Channel (E-RGCH) are fixed rate (spreading factor 128) dedicated downlink physical channels. The E-HICH comprises 3 or 12 consecutive slots, and the E-RGCH comprises 0.3, 12 or 15 consecutive slots. In each slot, a sequence of forty binary values is transmitted, but it is assumed that eighteen are required.

The sequence to be transmitted is given by an orthogonal sequence for a particular index, where the index is given by a sequence number and i.mod3, where i is the slot number.

In the illustrated embodiment, there is one piece of hardware for calculating the E-RGCH/E-HICH symbols, but there is a separate memory for each spreader stream 26 to allow mapping of an E-RGCH/E-HICH to any stream.

Every 64 chips a new value is calculated, which means that there are 4096 cycles available to calculate that new value. For all E-RGCH and E-HICH channels, a current slot is read (i.e. slot 0-15, 4 bits required to identify the slot), a current symbol is read (symbol 0-39), a signature index I is determined along with a relative grant a, which are provided by higher layers in the base station, a row index m(i) is determined from a table shown in FIG. 7(a) using the signature index I and i.mod3 for slot i. A corresponding Css code is read from the table shown in FIG. 7(b) and is multiplied with the relative grant value a. The current symbol for the current channel is stored. The process is repeated for the next E-RGCH or E-HICH. There will be approximately 720 cycles for eight channels, with forty signatures per channel.

Figure 7A:
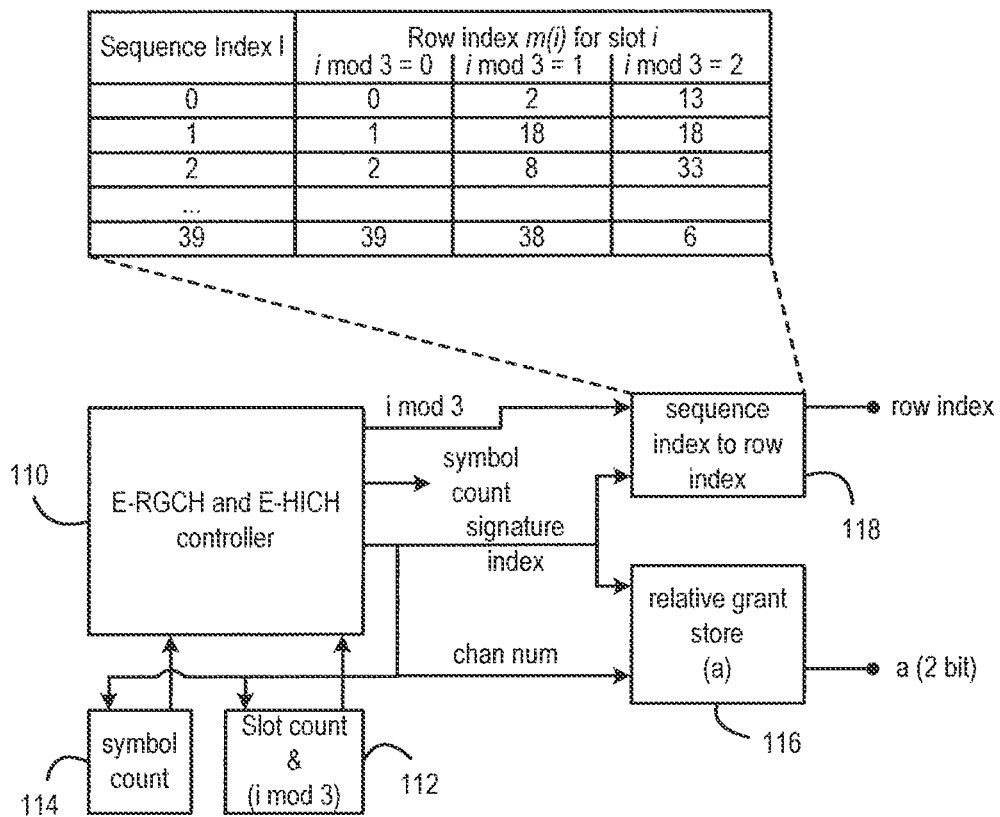
FIGS. 7(a) and 7(b) illustrate an architecture for pre-aggregating E-RGCH and E-HICH signatures.
Figure 7B:
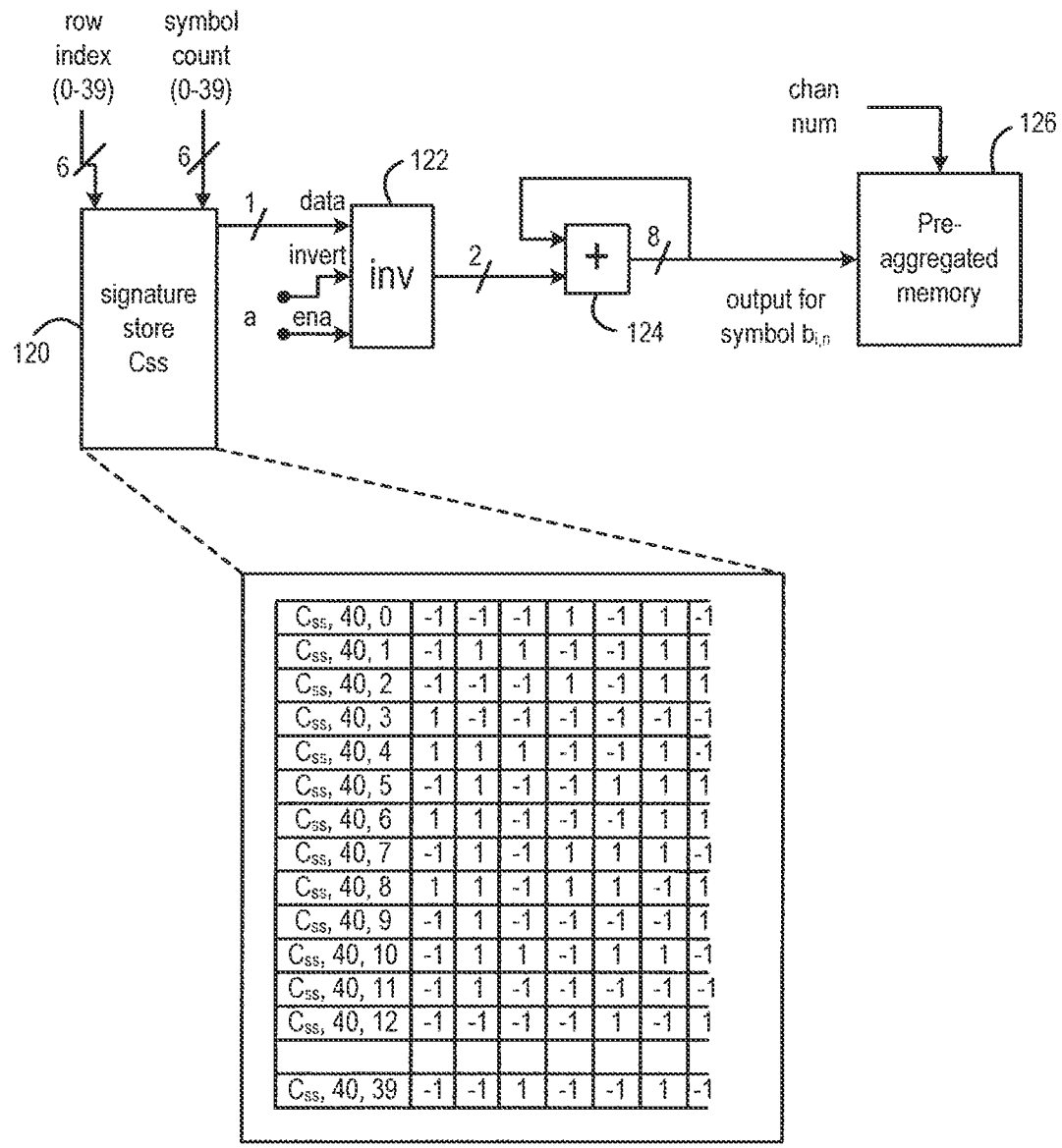

FIGS. 7(a) and 7(b) show an architecture for pre-aggregating E-RGCH and E-HICH signatures. A controller 110 is provided which controls and outputs the values of i.mod3 for a slot I, which are received from a slot count & i.mod3 unit 112, a signature index I, a symbol count, which is itself received from a symbol counter 114. The controller 110 also outputs a channel number to the slot counter 112, symbol counter 114 and a relative grant store 116. On receipt of the channel number (chan_num) and signature index from the controller 110, the relative grant store outputs a two-bit value of a. A sequence index to row index unit 118 receives the value of i.mod3 and signature index from the controller 110 and outputs an appropriate 6-bit row index (with values of 0-39). An exemplary signature hopping pattern for E-HICH and E-RGCH is shown in the sequence index to row index unit 118. This pattern is taken from the 3GPP specification for WCDMA.

In FIG. 7(b), a signature store 120 is provided which stores E-RGCH and E-HICH signature sequences Css. The signature store 120 receives the 6-bit symbol count (value from 0-39) from the controller 110 and the 6-bit row index from unit 118 and outputs the appropriate bit for the Css code. An exemplary set of signature sequences that are stored in signature store 120 are shown in FIG. 7(b). These exemplary signature sequences are taken from the 3GPP specification for WCDMA.

The Css code bit is output from the signature store 120 to a triple-input inverter 122. The inverter 122 also has a pair of inputs (labelled invert and enable) for receiving the value of a from the relative grant store 116.

The output of the inverter 122 comprises a two-bit value that is input into a dual-input adder 124. The output of the adder 124 is fed back to one of its inputs, so that the output of the inverter 124 is summed with the previous output of the adder 124. After the Css code is read out of the signature store 120, the signature index is incremented by one, and the Css code corresponding to the new row index is read out of the store 120. This latter symbol is input into the inverter 120, again with the corresponding value of a from the relative grant store 116.

Thus, as each preceding output of the adder 124 is summed with the output of the inverter 122 for the next signature, the resulting output of the adder 124 is a eight-bit output for symbol $b_{i,n}$. This output is stored in a pre-aggregated memory 126 for the respective channel indicated by the value of chan_num.

Figure 5B:
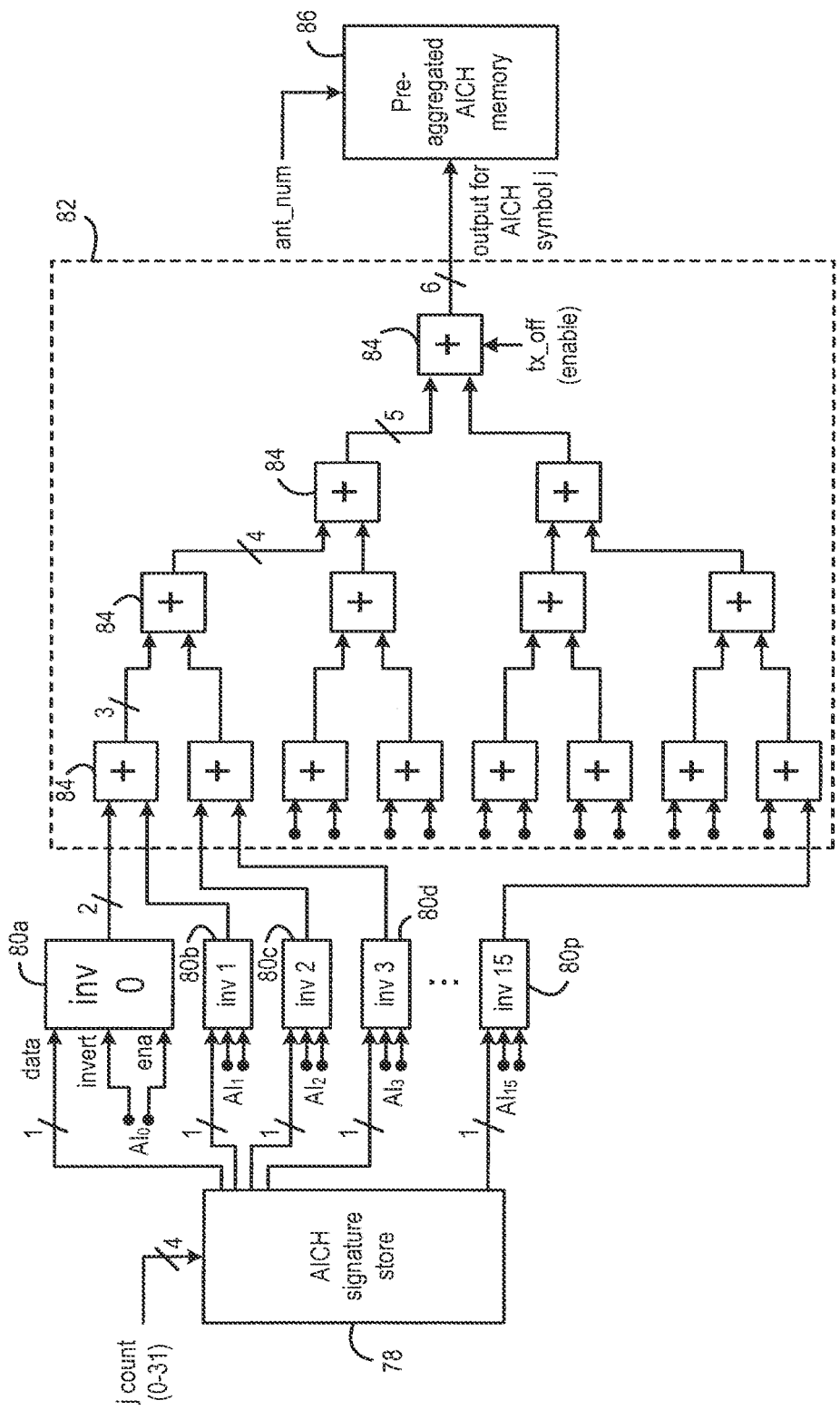

It will be appreciated that the E-RGCH and E-HICH signatures can also be pre-aggregated using a parallel implementation as shown in FIG. 5(b) for AICH signatures.

In either architecture, the latency of the signature pre-aggregation is reduced in comparison with prior art architectures.

A paging indicator channel (PICH) provides terminals in a WCDMA system with an efficient sleep mode operation. The PICH can also be calculated by the formatter block 32. The paging indicators use a channelisation code of length 256, and occur once per slot on the PICH. Each PICH frame comprises 288 bits to be used as the paging indicator, with 12 idle bits. Depending on the paging indicator repetition ratio, there can be 18, 36, 72 or 144 paging indicators per PICH frame. The frequency with which a mobile terminal needs to listen to the PICH depends on the system frame number (SFN).

As the latency of a single PICH calculation is around 50 cycles, it is preferred if the requirement for PICH frames is determined before the data is written to the external memory 24, and the PICH calculation started at that point.

A MBMS indicator channel (MICH) is a fixed rate (spreading factor 256) physical channel. One MICH frame of length 10 ms comprises 300 bits, with 288 bits being used to carry notification indicators, and the remaining 12 bits being unused. There can be either 18, 36, 72 or 144 indicators per frame.

As the latency of a single MICH calculation is around 12 cycles, it is preferred if the requirement for MICH frames is determined before the data is written to the external memory 24, as with the PICH frames above.

Returning now to FIG. 2, a gain block 36 is provided after the formatter 32. The gain block 32 has an associated gain memory 38, which receives gain values for storage from the controller 27. The gain values can relate to data, TPC, TFCI and pilot channels. Preferably, in order to avoid contention issues, each spreading stream has a respective gain memory 38 as shown.

The output of the gain block 36 is provided to a spreader 40, which multiplies the data to be transmitted by a sequence of 8 code bits (chips) in order to spread the data over the required bandwidth. The spreader 40 generates four chips of spreading and scrambling codes per cycle. The spreader 40 is connected to a spreading factor generator 42 which generates the required spreading factor based on information received from the controller 27. In a preferred embodiment, the spreading factor generator 42 is an orthogonal variable spreading factor (OVSF) generator 42.

Figures 8, 9A, 9B:
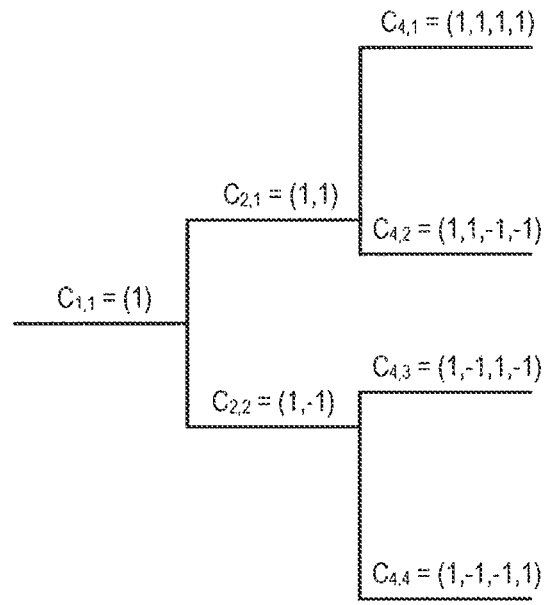
FIG. 8 shows the first three stages of an OVSF code tree.
FIGS. 9(a) and (b) show code generation using Walsh functions and OVSF functions respectively.

OVSF codes are known in the art and are simple to generate. They allow the spreading factor to be changed whilst maintaining orthogonality between different spreading codes of different lengths. FIG. 8 shows the first three stages of an OVSF code tree.

There are a couple of restrictions on the codes that can be used when transmitting from a single source. Another channel can use a certain OVSF code in the tree if no other channel to be transmitted using the same tree is using a code that is on an underlying branch (i.e. using a higher spreading factor code than the intended code to be used).

As mentioned above, OVSF codes are simple to generate: perform an AND operation on all bits in the code number and code position, and XOR the result (see below). Although this is simple, it results in a large amount of combinational logic being evaluated every cycle.

Therefore, in accordance with an aspect of the invention, it is proposed to store the four "spreading factor=4" codes (i.e. $C_{4,1}$, $C_{4,2}$, $C_{4,3}$ and $C_{4,4}$ shown in FIG. 8) in a memory in the processor 6. When a spreading code is to be generated, the four chips are read out of the memory and a number of AND and XOR operations are performed.

FIGS. 9(a) and (b) show simple, conventional code generation using Walsh functions and OVSF functions respectively. It can be seen from FIG. 9(a) that the table formed by the Walsh function follows a pattern. Specifically, in any block of four elements, the element in the bottom right-hand corner is the inverse of the elements in the other corners.

Thus, consider the codes and positions 00 and 01 in the top left quarter of FIG. 9(a). The element in the bottom right-hand corner of these four elements is 1, which is the inverse of the elements in the other corners (0). Examining each of the top right, bottom left and bottom right quarters of the table in FIG. 9(a) reveals the same pattern. Furthermore, if we examine the table in FIG. 9(a) as a whole, it can be seen that the values of the four elements in the bottom right-hand quarter are the inverse of the values of the elements in the other three quarters.

It is proposed that the OVSF codes are generated by exploiting this pattern, as shown in FIG. 10.

In FIG. 10, the left-hand shaded block marked "4×4 code" represents the four chips stored in the memory (which in this embodiment correspond to those shown in FIG. 9(a)). In accordance with this aspect of the invention, to form codes of length 8 (i.e. spreading factor=8), a logic element 130 generates a table of 8 bits by 8 bits, in which the 4×4 code is repeated in the top left, top right and bottom left corners. The logic element 130 also takes the inverse of the 4×4 code and places it in the bottom right corner of the 8 by 8 table. Thus, the eight spreading codes for spreading factor 8 have been constructed.

In order to construct the codes for a spreading factor of 16, the logic element 130 constructs a table of 16 bits by 16 bits, and repeats the 8 by 8 table generated previously in each of the top left, top right and bottom left corners. Again, the bottom right corner is formed by taking the inverse of the 8 by 8 table, as shown by the darker shaded region.

For higher spreading codes (32, 64, etc), further tables can be constructed by the logic element 130 as described above.

Returning again to FIG. 2, the data that has been spread by spreader 40 is passed to scrambler 44 which multiplies the spread data by a scrambling code or codes which enables different mobile terminals or base stations on the same frequency band in a cell to be distinguished from each other. Four chips are input into the scrambler 44 and four scrambled chips are output each cycle.

It is assumed that, in this embodiment, there are 64 code sets (one for each antenna associated with the processor 6), 3×16 codes per set (primary and secondary scrambling code, plus associated left and right), which means a total of 3072 codes. These 3072 initial code values can be stored in a full code initial memory 46, which is connected to the controller 27.

The currently active codes, selected from the 3072 initial code values in the full code initial memory 46 are stored in a code memory 48. If it is assumed that there are six active codes per cell, it is necessary to store 6×64 code values each being 2×18 bit shift register values.

It will be appreciated that the full code initial memory 46 and the code memory 48 can be combined into a single memory, which means that less multiplexing between the memories is required, but it also means that it is not possible to write to memory to initialise new code sets for an antenna whilst performing normal processing.

For every 4-chip minislot (which corresponds to 256 cycles), the four chips for all 384 (6×64) active scrambling codes are pre-calculated. A code generator block 50 is provided to generate the chips for the scrambling codes. The code generator block 50 may comprise more than one actual code generator. For example, it may comprise two code generators (one for primary and one for secondary) or three generators (one each for normal, left and right).

If the code generation is fully pipelined, approximately 96 cycles will be required. Alternatively, the code generation can be performed in parallel with data slots or frames being buffered. If there is no buffering, there will additionally be one or two chips of latency.

Figure 11:
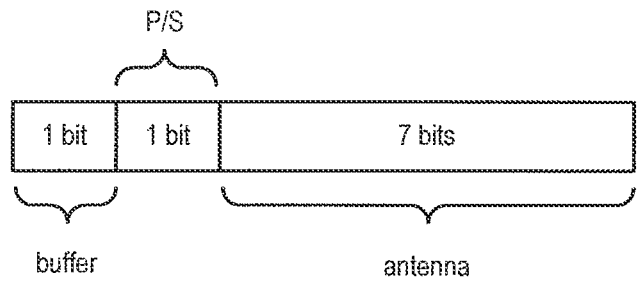
FIG. 11 shows a memory map for generated scrambling codes.

The generated codes can be stored in a double buffer for the current and/or next 4-chip minislot. Each of the normal, left and right have 4×2 data bits and 96×2 locations for double buffering. FIG. 11 shows the memory map for the generated codes. The first bit indicates the buffer, the second bit indicates whether it is primary or secondary, and the remaining seven bits indicate the antenna.

Figure 12:
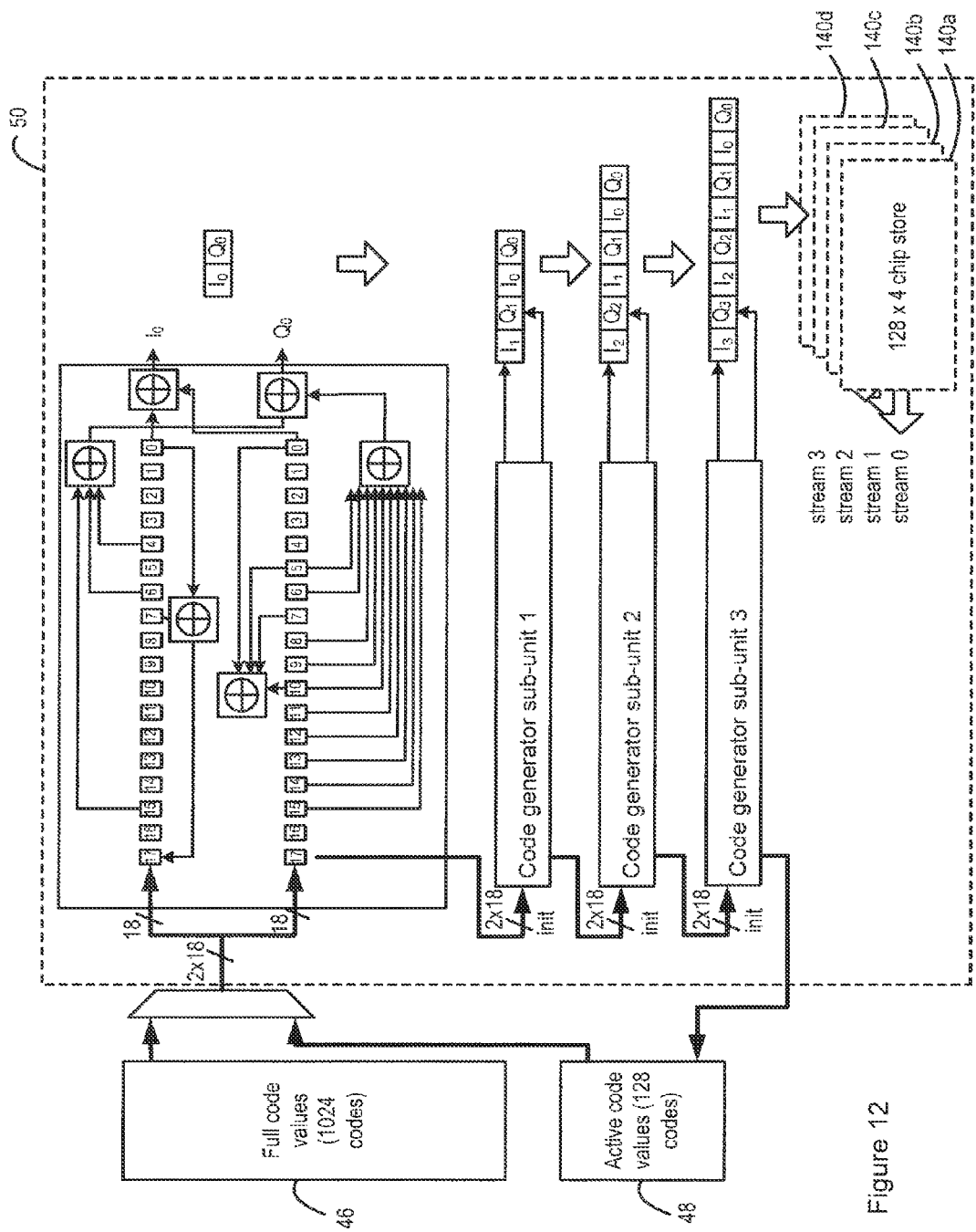
FIG. 12 shows part of the scrambling code generator of FIG. 2 in more detail.

FIG. 12 shows part of the code generator 50 of FIG. 2. This part of the code generator can be used for generating codes for normal, left or right.

Four chips of OVSF code are generated for each symbol at the spreader 40 by the code generator 50, but, as described above, the generated scrambling code is shared between the spreading streams 26.

Figure 13:
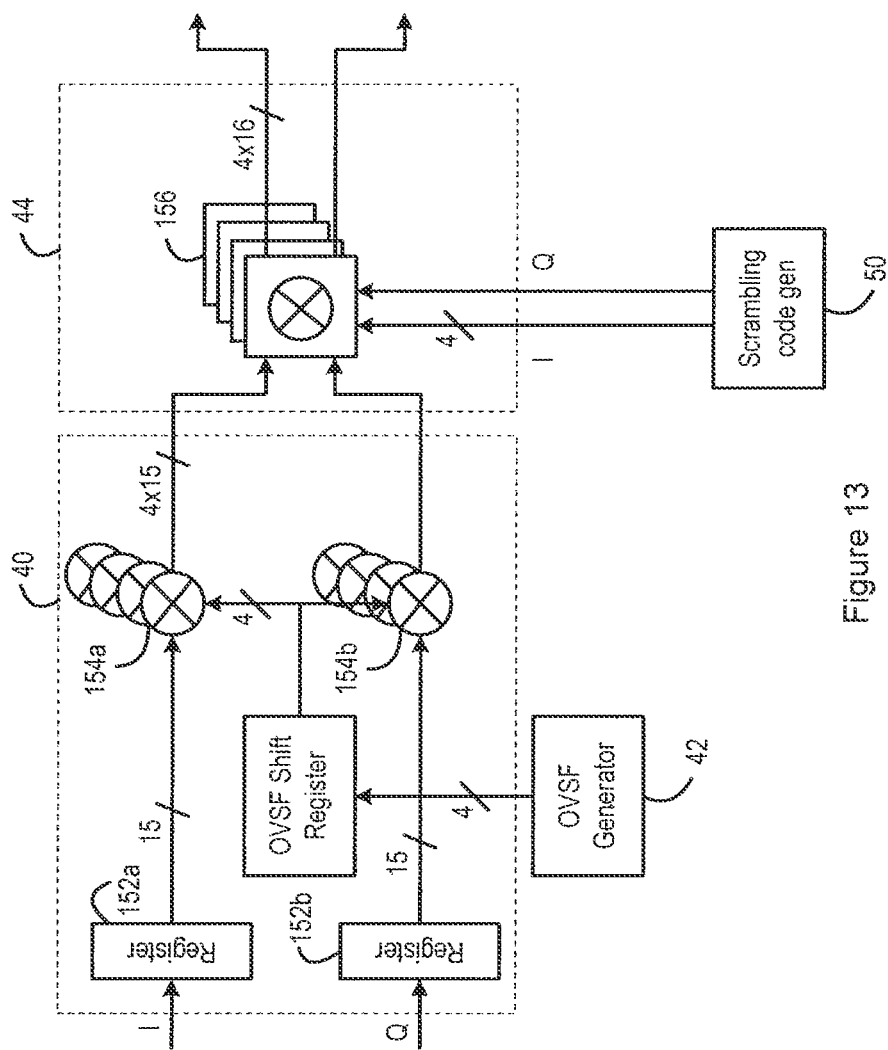
FIG. 13 shows a spreader and scrambler of FIG. 2 in more detail.

FIG. 13 shows the spreader 40 and scrambler 44 in more detail. The spreader 40 comprises an OVSF shift register for receiving the 4-bit OVSF codes, and two registers 152a and 152b arranged in parallel. The registers 152a and 152b each receive a 15-bit word from the gain block 36, one for the in-phase (I) part of the signal and one for the quadrature (Q) part of the signal, and these words are passed to a respective set of multipliers 154a and 154b. These multipliers 154a and 154b combine the 15-bit words separately with each bit of the generated OVSF codes currently stored in the shift register 150 to form the four chips of spread data. The output of each set of multipliers 154a and 154b comprises four 15-bit words (i.e. four chips), which are passed to the scrambler 44.

The scrambler 44 comprises a set of multipliers 156 which combine the I and Q outputs of the spreader 40 with the codes generated by the scrambling code generator 50. The resulting output comprises four 16-bit words (i.e. four chips) for each of the I and Q components of the signal. It should be noted that each of the four lines at the output of the scrambler 44 in FIG. 2 carry both the I and Q components of the signal.

Returning once again to FIG. 2, the four-chip output of the scrambler 44 is separated and the individual chips are provided to respective adders 52a, 52b, 52c and 52d. The output of the adders 52a-d is provided to a respective chip memory 54, 56, 58, 60 for each of the four chips. The output of each chip memory 54, 56, 58, 60 is fed back to the second input of the respective adder 52a-d. In this way, the chip 0 for one user is added to the chip 0 for the next user.

The outputs of the chip memories for each of the spreader streams 26 are provided to a transceiver interface 62 which maps the chips to the appropriate transceiver 8 for transmission. In a preferred embodiment, the transceiver interface 62 is a CPRI switch. The CPRI switch comprises a number of buffers which can store four chips of data for any of the transceivers 8 on that link. Preferably, the buffers are double buffers which allows throughput to be maintained.

Figure 14A:
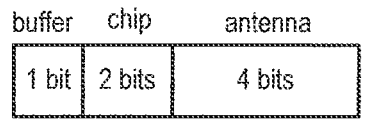
FIGS. 14(a) and (b) show memory maps for an implementation with 16 antennas and an implementation with 64 antennas respectively.
Figure 14B:
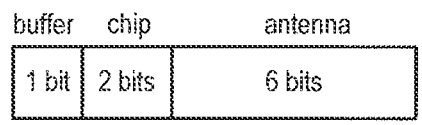

FIGS. 14(a) and (b) show memory maps for data chips passing into the CPRI switch 62. FIG. 14(a) shows a memory map for 16 transceivers, with the first bit indicating which buffer in the double buffer it should be stored, the next two bits indicating the chip number, and the final 4 bits indicating the transceiver 8. FIG. 14(b) shows a memory map for 64 transceivers, with the first bit indicating which buffer in the double buffer it should be stored, the next two bits indicating the chip number, and the final 6 bits indicating the transceiver 8.

Figure 15:
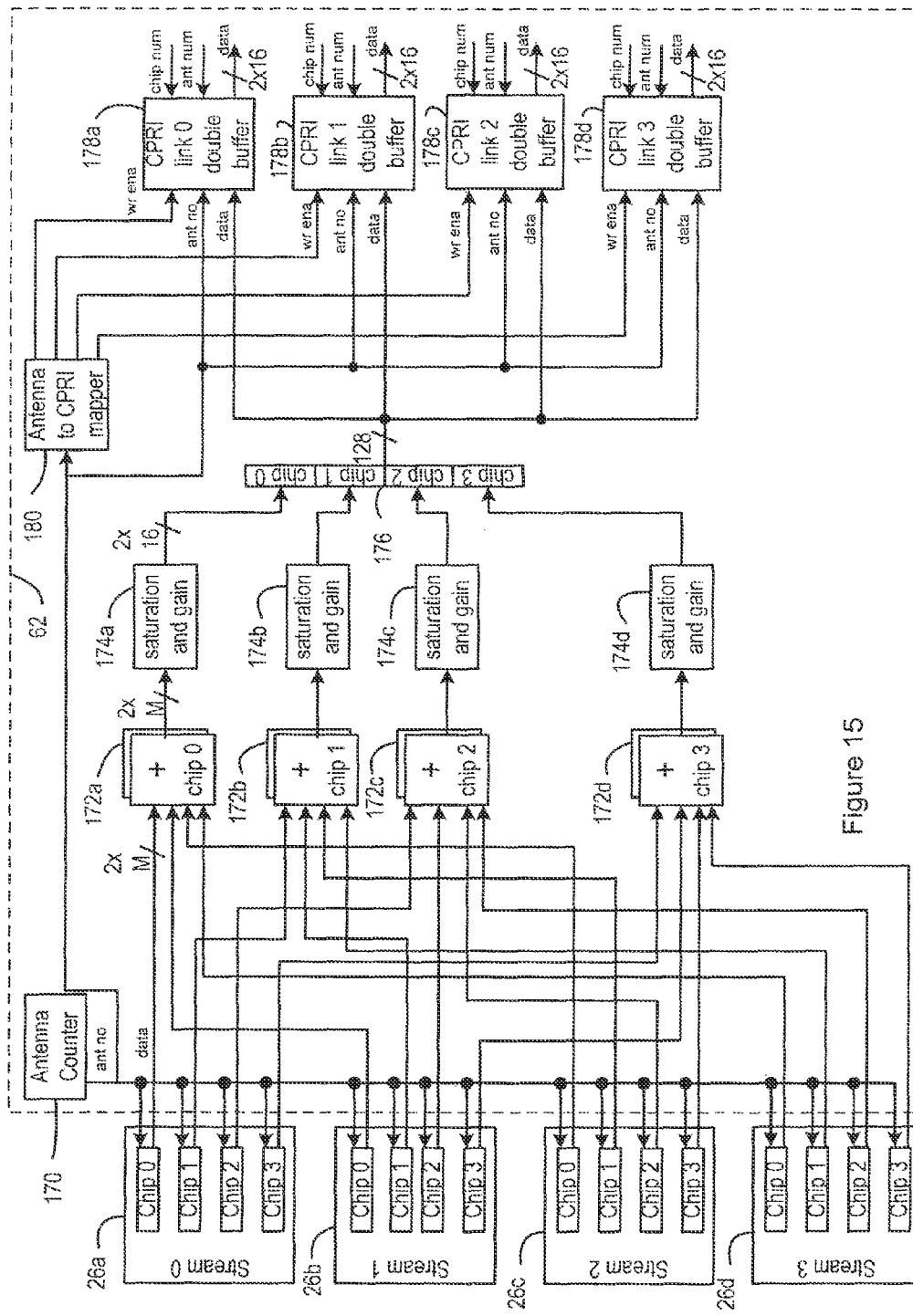
FIG. 15 shows the streams-to-CPRI switch interface.

FIG. 15 shows the structure of the transceiver interface 62 in more detail. The interface 62 comprises an antenna counter 170 which outputs an antenna number (ant no) to each of the chip memories 54, 56, 58, 60 in the four spreader streams 26a-26d. If there is a chip stored in any of the chip memories for the indicated antenna number, that chip data is output to an adder tree. Respective adder trees 172a-d are provided for each of the four chips, so that all the chips from the Chip 0 memories 54 are summed together by adder tree 172a, all the chips from Chip 1 memories 56 are summed together by adder tree 172b, and so on. The output of each adder tree 172a-d comprises two M-bit words, one for the I component, and the other for the Q component. The value of M depends on the number of users, and the total bit width could be 30 bits, with a 4-bit input for HS channel, 16 bits growth for gain, 1 bit growth for scrambling, 9 bits growth for there being 512 users.

Figure 16:
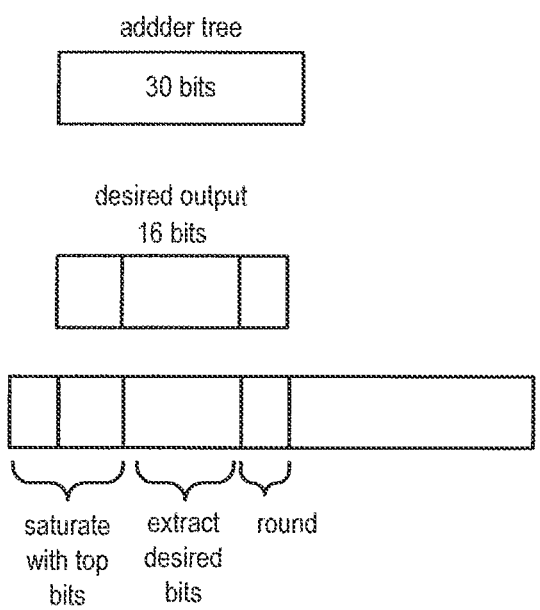
FIG. 16 shows the effect of shift, saturation and rounding on the output of the spreading streams.

The output of the adder trees 172a-d are provided to respective saturation and gain blocks 174a-d. In this embodiment, the 30 bits input to the blocks 174a-d are mapped to 16 bits at the output of the blocks. This is illustrated in FIG. 16. A barrel shifter can be used (which can either be implemented in logic elements or DSP blocks) to shift a data word by a specified number of bits. The 16-bit output is obtained and rounded up if the bit below the least significant bit is a 1. If any of the discarded most significant bits are set, then the 16 bit output is saturated to its maximum value.

The output of the saturation and gain blocks 174a-d are stored in memory block 176, so that the data is output in the order Chip 0, Chip 1, Chip 2 and Chip 3.

The data stored in memory block 128 is then output as a single stream of data (i.e. comprising 128 bits) to four double buffers 178a-d, which are labelled CPRI link 0, CPRI link 1, CPRI link 2 and CPRI link 3. An antenna-to-CPRI mapper 180 is provided that outputs respective write enable (wr ena) control signals to the buffers 178a-d, based on the buffer to which the current data should be stored for transmission.

Each of the double buffers 178a-d receives the antenna count (ant no) from the antenna counter 170 which allows the buffers to indicate the antenna for which the data is intended. Thus, any antenna can be mapped to any CPRI link 178.

To output data to the antenna, each double buffer 178a-d receives an indication of the current antenna being processed (ant_num) and the required chip number (chip num). If data is stored in one or more of the double buffers 178a-d for the antenna identified by ant_num, the appropriate chip of data is output from the buffer 178a-d. This output will comprise two 16-bit chips.

There is therefore described a processor for a base station control unit that allows the flexible allocation of users of any data type to any of a plurality of antennas with which the base station control unit is associated. The processor has the advantages that there is low latency in the data stream (typically 4-5 chips), there is flexible support for a large number of spreaders, and any user or spreader can be processed by any stream.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A processor for a base station control unit, the base station control unit being associated with a plurality of antennas, the processor comprising:
   a first interface for receiving a plurality of processing streams, each stream being suitable for generating signals for at least one user in a plurality of users, wherein a processing stream of the plurality of processing streams can generate the signals for any user in the plurality of users and for transmission by any antenna in the plurality of antennas;
   a code memory for storing a code block, the code block comprising a first set of codes having a corresponding first length; and
   a processing unit for retrieving the code block from the code memory, and for forming a second set of codes having a corresponding second length by generating a first square grid comprising a plurality of copies of the code block, wherein the values of the codes in the copy of the code block in the bottom right corner of the first square grid are inverted.

2. A processor as claimed in claim 1, wherein the plurality of processing streams comprises spreader streams.

3. A processor as claimed in claim 2, wherein a spreader stream processes symbols in a data stream associated with a user.

4. A processor as claimed in claim 3, wherein the spreader stream processes in parallel a plurality of chips derived from each symbol.

5. A processor as claimed in claim 4, wherein the spreader stream processes in parallel four chips derived from each symbol.

6. A processor as claimed in claim 4, wherein the spreader stream processes symbols for different users in consecutive cycles.

7. A processor as claimed in claim 1, further comprising a transceiver interface associated with outputs of the plurality of processing streams, the transceiver interface being operable to allocate any output from the plurality of processing streams to any one of the antennas in the plurality of antennas.

8. A processor as claimed in claim 7, wherein the transceiver interface is operable to select an antenna and to retrieve outputs from each of the plurality of processing streams relating to the selected antenna, and to combine the retrieved outputs to provide a composite output for the selected antenna.

9. A processor as claimed in claim 8, wherein the transceiver interface further comprises one or more buffers associated with a respective one or more of the plurality of antennas, the transceiver interface being operable to store the composite output in the buffer associated with the selected antenna.

10. A processor as claimed in claim 9, wherein, in response to the output of the processing streams including a plurality of chips, the transceiver interface is operable to separately combine the respective chips for the selected antenna.

11. A processor for generating variable-length spreading codes, the processor comprising:
    a code memory for storing a code block, the code block comprising a first set of codes having a corresponding first length; and
    a processing unit for retrieving the code block from the code memory, and for forming a second set of codes having a corresponding second length by generating a first square grid comprising a plurality of copies of the code block, wherein the values of the codes in the copy of the code block in the bottom right corner of the first square grid are inverted.

12. A processor as claimed in claim 11, wherein the processing unit is further for forming a third set of codes having a corresponding third length by generating a second square grid comprising a plurality of copies of the first square grid, wherein the values of the codes in the copy of the first square grid in the bottom right corner of the second square grid are inverted.

13. A processor as claimed in claim 12, wherein the processing unit is further for forming a fourth set of codes having a corresponding fourth length by generating a third square grid comprising a plurality of copies of the second square grid, wherein the values of the codes in the copy of the second square grid in the bottom right corner of the third square grid are inverted.

14. A processor as claimed in claim 11, wherein the code block comprises four codes each having a length of four bits.

15. A processor as claimed in claim 14, wherein the second set of codes comprises eight codes each having a length of eight bits.

16. A processor as claimed in claim 11, wherein the third set of codes comprises sixteen codes each having a length of sixteen bits.

17. A processor as claimed in claim 13, wherein the fourth set of codes comprises thirty-two codes each having a length of thirty-two bits.

18. A method for generating variable-length spreading codes, the method comprising:
    receiving a code block, the code block including a first set of codes;
    generating a first square grid including a plurality of copies of the code block and at least one inverted copy of the code block to obtain a second set of codes, the at least one inverted copy of the code block having code values that correspond to an inverse of the values of the corresponding code in the code block; and
    storing the second set of codes, wherein generating the first square grid comprises arranging the plurality of copies of the code block and the at least one inverted copy of the code block in a matrix format including a bottom right corner, such that the inverted copy of the code block is located in a bottom right corner of the first square grid.

19. The method of claim 18 further comprising:
    generating a second square grid including a plurality of copies of the first square grid and at least one inverted copy of the first square grid to obtain a second set of codes, the inverted copy of the first square grid having code values that correspond to an inverse of the values of the corresponding code in the first square grid wherein:
    generating the second square grid comprises arranging the plurality of copies of the first square grid and the at least one inverted copy of the first square grid in a matrix format including a bottom right corner, such that the inverted copy of the first square grid is located in a bottom right corner of the second square grid.

20. A processor as claimed in claim 11, further comprising:
control unit for receiving a predetermined set of signature sequences, each signature sequence comprising a plurality of symbols, and for outputting, in parallel, a first symbol from each of a subset of the plurality of signature sequences; and
an adder for summing the respective first symbols to provide a first pre-aggregated output.

21. A processor as claimed in claim 20, further comprising:
at least one inverter arranged between the control unit and the adder the at least one inverter receiving an acquisition indicator for a signature sequence from the subset of the plurality of signature sequences and a corresponding first symbol for said signature sequence, and using the acquisition indicator to selectively invert the first symbol.

22. A processor as claimed in claim 20, further comprising:
a pre-aggregated memory for storing the pre-aggregated outputs from the adder.

23. A processor as claimed in claim 20, wherein the control unit is adapted to output a second symbol from a first of the predetermined set of signature sequences.

24. A processor as claimed in claim 11, further comprising:
control unit for receiving a predetermined set of signature sequences, each signature sequence comprising a plurality of symbols, and for outputting, in series, a first symbol from each of a subset of the plurality of signature sequences; and
an adder for summing the respective first symbols to provide a first pre-aggregated output.

25. A processor as claimed in claim 24, wherein the predetermined set of signature sequences comprises Acquisition Indicator Channel signatures.

26. A processor as claimed in claim 25, further comprising:
an inverter disposed between the control unit and the adder, the inverter receiving an acquisition indicator for a signature sequence from the subset of signature sequences and a corresponding first symbol for said signature sequence, and using the acquisition indicator to selectively invert the first symbol.

27. A processor as claimed in claim 25, further comprising:
a pre-aggregated memory for storing the pre-aggregated outputs from the adder.

28. A processor as claimed in claim 25, wherein the control unit is adapted to output, in series, a second symbol from a signature sequence in the subset.

29. A processor as claimed in claim 24, wherein the predetermined set of signature sequences comprises E-DCH Hybrid ARQ Indicator Channel signatures or E-DCH Relative Grant Channel signatures.

30. A processor as claimed in claim 29, further comprising:
an inverter disposed between the control unit and the adder, the inverter receiving a relative grant value for a signature sequence from the subset and a corresponding first symbol for said signature sequence, and using the relative grant value to selectively invert the first symbol, the output of the inverter being provided to the adder.

31. A processor as claimed in claim 29, further comprising:
a pre-aggregated memory for storing the pre-aggregated outputs from the adder.

32. A processor as claimed in claim 29, wherein the control unit is adapted to output a second symbol from a signature sequence in the subset.

* * * * *